United States Patent

[11] 3,589,169

[72] Inventors Rene Lafitte;
 Paul LeCarpentier, both of Caen (Calvados), France
[21] Appl. No. 826,223
[22] Filed May 20, 1969
[45] Patented June 29, 1971
[73] Assignee U.S. Philips Corporation
 New York, N.Y.
[32] Priority May 22, 1968
[33] France
[31] 152778

[54] METHOD AND DEVICE FOR THE ANALYSIS OF GAS
 24 Claims, 2 Drawing Figs.
[52] U.S. Cl. .................................................. 73/23,
 73/17, 23/294, 55/82
[51] Int. Cl. ................................................ G01n 25/04,
 B01d 7/00
[50] Field of Search.......................................... 73/17, 23,
 25, 26, 27, 29; 23/264, 273, 294; 55/82

[56] References Cited
UNITED STATES PATENTS
2,316.624 4/1943 Romanelli.................... 73/17
2,588,355 3/1952 Burr............................ 73/17
2,944,878 7/1960 Jacque........................ 23/294
3,042,501 7/1962 Noblitt........................ 23/294
FOREIGN PATENTS
131,846 5/1951 Sweden....................... 73/17

*Primary Examiner*—Richard C. Queisser
*Assistant Examiner*—C. E. Snee, III
*Attorney*—Frank R. Trifari ABSTRACT: A method and an apparatus for analyzing a gaseous mixture by flowing the mixture along a refrigerated tube having a temperature gradient along its length, with the component gases of the mixture condensing at different axial locations on the tube and means provided for determining the condensing temperature at each location. The temperature gradient is then shifted axially, with the cold end slightly warmed, such that the component which condensed at the lowest temperature is evaporated, carried to a freezer where it is independently recondensed, and finally evaporated to determine its vaporization temperature, leading to an identification of the component gas and its proportion in the mixture.

INVENTORS
RENÉ LAFITTE
PAUL LE CARPENTIER
BY

AGENT

METHOD AND DEVICE FOR THE ANALYSIS OF GAS

This invention relates to a method of analyzing gaseous mixtures and to a device for carrying out this method.

The analysis of gas impurities contained sometimes merely as traces, in a so-called pure gas, requires the use of highly sensitive methods. The mixture-analyzing methods based on variations of various physical or chemical properties of a mixture in dependence upon its composition are not satisfying; in the case of a low content, it is found to be necessary to separate the impurities, which are subsequently identified and defined quantitatively; in most cases it is, moreover, necessary first to perform a concentration of the impurities in order to permit an analysis of sufficient accuracy.

Known analyzing methods such as gaschromatography, spectrophotometry or specific chemical reactions, comprise various steps: concentration, separation, identification and measurement. Most of these methods do not permit detection of contents below 1 p.p.m. (parts per million) of volume. Other methods, which are more sensitive, are based on specific properties of the impurities and can be employed only when the nature of the impurities is known beforehand. Other methods such as those based on spectrophotometry permit detection and measuring of any impurity, even as traces, but the possibilities of identification are uncertain. The known methods do therefore not permit the combining of methods having a very high sensitivity, with a precision of nonspecific measurement, and with a certainty of identification by means of a single apparatus.

When the impurity to be measured is water vapor, there exists a method in which this vapor is condensed at a very low temperature; the measurement of the temperature at which a condensate is formed, termed dew point, corresponds to a partial pressure from which the content is derived. The dew point measuring instruments are usually not suitable for measuring other impurities; moreover, in most of these devices the temperature of a gas is decreased gradually and very slowly in order to produce the dew; the dew appears abruptly at a given temperature, but this phenomenon is not perfectly reversible and the temperatures at which this dew gradually disappears during a rise of temperature differ from the temperature at which the dew appears. The temperature difference between these phenomena amounts to a few degrees and renders the measurements inaccurate and the results uncertain, especially in the case of a very low impurity content.

The invention has for its object to allow detection, separation, and measurement of gaseous impurities contained, even in the form of traces, in a gas, as for example, in one of the industrial gases of high purity employed in highly demanding techniques such as the manufacture of semiconductors.

The method in accordance with the invention comprises a first stage of separation of the impurities, after which the impurities are successively isolated for being identified, their contents being derived from said identification and the measurements carried out during the separation step.

The invention is based on the recognition of the fact that a deposit of the condensate of an impurity of a gas caused to contact a cooled surface having an adequate temperature gradient occupies a limited portion of said surface in dependence upon the content and the nature of the impurity and that a shift of the temperature gradient permits of displacing the deposit. If the temperature gradient is constant and has a suitable range and covers a sufficient length of the surface, the various impurity deposits can be distinguished; by appropriate modification of the gradient these deposits may be caused to migrate successively, if necessary up to a device where under satisfactory conditions of isolation identification is possible, for example, by measurement of the melting temperature. When the impurity is identified, the vapor pressure—temperature curve thereof permits of deriving its percentage from the temperature of said surface point where the boundary of the condensate deposit was located prior to the migration thereof.

According to the invention the method of analyzing a gaseous mixture is mainly characterized in that said mixture is caused to circulate along a heat exchanger having an external, stable and known decreasing temperature gradient in the direction of length, the positions of the boundaries of the condensate deposits being localized along said exchanger, after which the condensates are selectively transported by a modification of said gradient to a device where they are successively isolated and identified, in which device at least one measurement of the melting temperature is carried out for each of them.

An analysis carried out by the method in accordance with the invention has a very high sensitivity because the boundary of the condensate deposit appearing along a surface of decreasing temperature is sharply defined, even with a very slight deposit; this boundary determines an accurate temperature in contrast to the appearance or disappearance of condensates on a surface whose temperature varies with time.

The method is not specific for a mixture or a constituent and permits detection of all impurities of any gas by a common measuring method by means of a single apparatus. The identification of the constituents of a mixture is also based on a well-defined phenomenon because the melting temperature is substantially independent of other factors such as pressure.

Since the condensation temperature corresponds to a particular partial pressure of an identified constituent, this pressure is accurately determined owing to the sharpness of the limit of the condensate deposits and the knowledge of the partial pressure and of the nature of the constituent permits easy calculation of the content.

The condensates obtained are usually in the crystalline state, since the partial pressure of each of the constituents analyzed is very low and lower than the pressure corresponding to the triple point of the phase diagram of the constituent concerned.

The method in accordance with the invention has furthermore the advantage that there is no need for compressing the gas to be analyzed.

In a preferred form of the method applied to a known gas mixture containing impurities to be analyzed in very small percentages, these impurities are concentrated by a known, reversible method of fixation and subsequent release in a transporting gas prior to the selective transfer of the condensates for identification said fixation is carried out by condensation in a cooling device or preferably by adsorption.

In this method the gas to be analyzed is brought into contact with the heat exchanger without concentration of the impurities for determining the boundaries of the condensate deposits and, subsequent to concentration of the impurities, for obtaining larger deposits which facilitate the identification.

The present invention also relates to a device for carrying out the above-mentioned method, which comprises an assembly of two substantially concentrical tubes: an inner tube having a polished surface is traversed by a controllable cooling fluid; one external tube, which is at least partly transparent, is traversed in the opposite direction by the gas to be analyzed which may emanate from a concentration device. The inner tube is provided with temperature measuring members along its external surface. The external tube is prolonged on the gas outlet side by a channel opening out in a device for measuring the melting temperature. The latter may be of any known type of precision measurement.

In a preferred embodiment of the device in accordance with the invention said melting-temperature measuring device is described in applicants copending U.S. Pat. application Ser. No. 826,222.

The following description given by way of nonlimiting example with reference to the accompanying drawing will show how the invention may be carried into effect, the details resulting both from the drawings and the text forming, of course, part of said invention.

Figure 1:
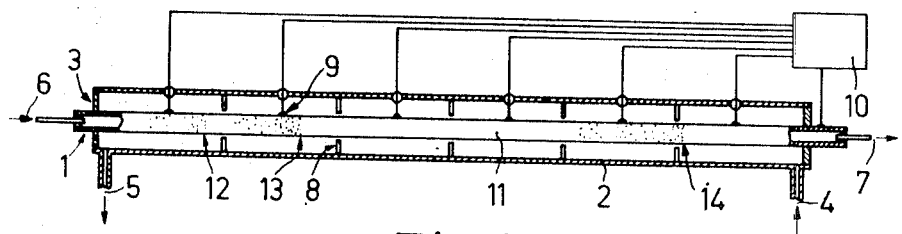
FIG. 1 is a schematic sectional view of a device for separating the constituents of a gaseous mixture.

The device shown in FIG. 1 comprises two substantially concentrical tubes 1 and 2. The inner tube 1 is made, for example, of polished, preferably nickel- or chromium-plated copper and the external tube 2 may be made of glass. Plugs 3 provide a seal between the two tubes at the two ends. The gas to be analyzed is introduced at 4 into the tube 2 and is removed at 5. A cooling fluid is let in at 6 into the tube 1 and conducted away at 7. Baffles 8 of low thermal conductivity are arranged between the two tubes; they are distributed and shaped for producing turbulences in the trajectory of the gas to be analyzed. These turbulences prevent the formation of a zone of gaseous deposits around the inner tube 1, which zone, carried along by a laminar flow, would not have sufficient contact with the tube, and the condensate formed in the gas phase would not be deposited. The turbulent flow produces a transverse gradient of temperature in the immediate vicinity of the tube 1 and improves the efficiency of the condensation operations.

The means for measuring the temperature gradient at the surface of the tube 1 are formed by a plurality of thermoelements 9, fixed to the tube 1 and connected to an indicator and, preferably, recorder 10. The tube 1 may serve as a common return circuit for these thermoelements.

When the gas to be analyzed is passed through the tube 2 and a sufficient quantity of cooling fluid through the tube 1 in the opposite sense, condensation deposits are produced along the surface 11 of the tube 1 in different regions. These regions of deposits have a sharply defined boundary on the higher temperature side, for example, at 12, 13, 14, while the density of each deposit decreases in the flow direction of the gas to be analyzed and finally vanishes because the concentration of each deposited body decreases in accordance with the formation of the deposit. Although various deposits of this type may partially overlap each other, the various boundaries are sufficiently defined for being observable.

The number of temperature measuring points is chosen so that a correct trajectory of the temperature curve along the tube 1 can be obtained. The temperatures at the boundaries of the condensation deposits such as 12, 13 or 14 are read from said curve in accordance with their positions.

Figure 2:
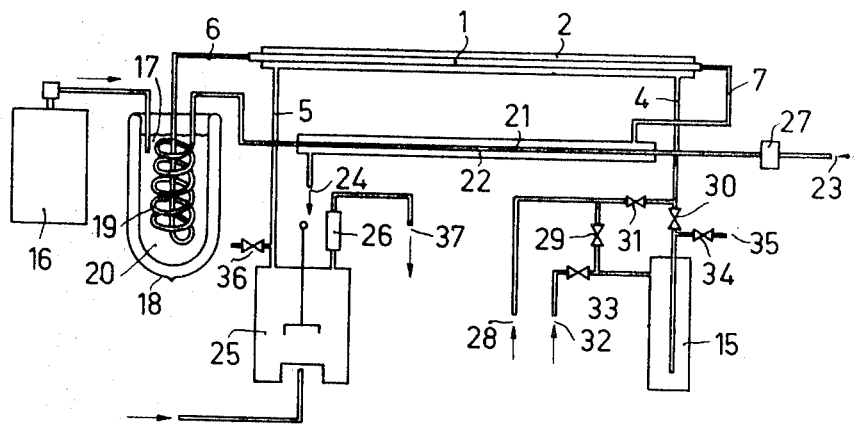
FIG. 2 is a diagram of an analyzing device in accordance with the invention.

The diagram of FIG. 2 also comprises the tube 1 for the circulation of the cooling fluid and the tube 2 for the circulation of the gas to be analyzed. The apparatus required for carrying out the method in accordance with the invention may furthermore comprise: a device for concentration by collection in a space indicated at 15, a cooling device comprising a coolant reservoir 16, for example liquid nitrogen, or liquid air or liquid helium, feeding at 17 a Dewar vessel 18, which comprises a helical tube 19. This helix is traversed by a second coolant, for example, gaseous nitrogen, which subsequent to cooling is passed through the channel 6 in the inner tube 1. In order to reduce the consumption of the latter coolant, an exchanger 22 is provided in which said second coolant entering at 23 is cooled a first time during its passage through the inner tube 21 of said exchanger by the still cold gas emanating from the tube 2 via the channel 7 and escaping at 24.

The temperature gradient decreasing along the tube 1 might be obtained in a different way. It is found, however, that the use of a solely gaseous flow as a coolant provides a stable temperature gradient readily variable by a simple flow control. Moreover, in order to utilize the cooling fluid under the best conditions it is advantageous to use the indirect method of the kind described above.

The apparatus shown comprises in addition an identifying device 25, which is advantageously provided with a flow meter 26 and a given number of valves required for establishing the circuits corresponding to the various stages of the process. The communication channel 5 between the tube 1 and the device 25 has a very small diameter.

By way of example the various stages of the analysis of a gas, for example, nitrogen containing traces of some impurities will be described hereinafter, said impurities being formed by a quantity of water vapor and other undefined elements. This gas is first introduced at 28, the valves 29, 30 and 36 being closed and the valve 31 being open, so that the measuring circuit is cleaned. The flow capacity may be 10 litres/minute. The tube 1 is then brought to a low temperature, for example, by circulating nitrogen through the tube 21, the helix 19, the tube 1 itself and the exchanger 22.

The Dewar vessel 18 receives liquid nitrogen and the flow of the cooling gas entering at 23 is controlled by the flow meter 27 and the level of the cooling liquid 20 is limited so that along the tube 1 a temperature gradient approximately in the lowest possible temperature range is obtained, however, above the condensation temperature of the gas to be analyzed and preferably below the low points of the water vapor contained therein. The temperature of the tube 1 passes for example from $-70°$ C. to $-180°$ C. over a length of 1 to 2 m.

The various impurities contained in the gas are deposited on the cooled tube from places cooled to their respective dew points and separate zones always appear with a sharply defined boundary on the gas inlet side. All impurities condensable between $-180°$ C. and the ambient temperature can be deposited.

The boundaries are localized and the corresponding temperatures are derived from their positions and from the temperature curve of the tube 1, which in turn is derived from the temperatures read from the device 10. A precision of the order of one degree is readily obtainable by said measurement.

It is then possible to carry out a selective transfer of the condensate deposits into the identifying device, but unless the preceding deposition of the condensates has been performed for a very long time, if necessary for a few days, the quantities transferred are likely to be small. It is mostly to be preferred to perform the deposition of the condensates in accordance with the preceding method, after a concentration of the impurities.

For said concentration the gas to be analyzed is introduced into the flask 15 provided with adsorbing materials, such as zeolites. The valves 33, 30 and 31 are closed and the valves 29 and 34 are open. The flask 15 may furthermore be cooled at a temperature near that of the liquid nitrogen. This trapping is performed up to saturation of the adsorbing products. The flask 15 is then brought to the desorption temperature, which has to be equal to the temperature at which the adsorbing products have been regenerated prior to the trapping operation, for example, 400° C. The deposition of the condensates is then carried out by introducing into the tube 1, after the valve 30 is opened, either the gas to be analyzed introduced at 28, while the valve 29 is open, or a different transporting gas introduced at 32, the valve 33 being open and the valve 29 being closed, either of which gases carries along the impurities during its passage through the flask 15 with a concentration 100 to 1000 times higher than that in the gas to be analyzed. The flow may be 0.5 litre/min.

The deposition of the various condensates on the tube 1 is performed more rapidly and more consequentially than in the case in which the impurities are not previously concentrated.

For the identification of the various deposits they are subsequently transferred one by one into the device 25. For this purpose the flow of the gas introduced at 23 is varied so that the tube 1 is gradually reheated so that the zones of the deposits are displaced towards the identifying device 25; the flow of the transporting gas may be 0.1 litre/min. The transfer is interrupted by stabilizing the temperature gradient as soon as the whole first deposit has disappeared from the tube 1 (for example, the deposit indicated at 12 in FIG. 1). If the identifying device employed is that disclosed in copending application Ser. No. 826,222 the dew appearing in the solid state on the polished cooled surface provided for this purpose is captured in a minimum volume and then reheated until melting is observed. A measurement of the evaporation temperature may be carried out, which provides a confirmation of the identification obtained by the melting phenomenon.

Then the device 25 is cleaned prior to the transfer of the second deposit (for example, the deposit indicated at 13 in FIG. 1), so that a second impurity can be identified. All deposits marked on the tube 1 are transferred and identified in the order of appearance along the tube 1 during the first deposition.

After the identification of the relevant impurities the transfer to their vapor-pressure curve of the limit temperature of appearance of deposits on the tube 1 during the first operation provides their partial pressures within the gas to be analyzed, from which their percentages are derived.

If the impurities contained in the gas to be analyzed are already known and the percentages have been evaluated, the device in accordance with the invention permits of determining their concentrations, even if the concentration is lower than 1 p.p.m. It should be noted that even with concentrations of the order of $10^{12}$ p.p.m., the condensate can be distinguished while the boundary of the condensate can be easily localized.

As a matter of course, modifications may be applied to the embodiments described above particularly by using other equivalent technical means within the scope of the present invention.

We claim:

1. A method for analyzing a gaseous mixture comprising the steps:
   a. establishing on an elongate heat exchanger a temperature gradient spanning the condensation temperatures of the components of the mixture to be analyzed,
   b. flowing the mixture along said heat exchanger in a direction of decreasing temperature, and thereby forming condensate deposits of the components at different positions along the length of the heat exchanger, and measuring the temperatures at said positions,
   c. translating said temperature gradient along the heat exchanger, and thereby displacing said condensate deposits toward the colder end, and transferring the deposit having the lowest condensation temperature off the exchanger, and
   d. determining the melting temperature of said transferred deposit, for identification thereof.

2. A method according to claim 1 comprising the further steps of successively translating said temperature gradient, and with each of said translations, displacing said condensate deposits toward the colder end of the exchanger, and transferring off the exchanger only the deposit having the lowest condensation temperature of the remaining deposits.

3. A method according to claim 1 wherein establishing said temperature gradient comprises circulating a coolant along the heat exchanger in a direction opposite the flow of the gas mixture to be analyzed.

4. A method according to claim 2 wherein translating the temperature gradient comprises reducing the cooling effect of the coolant, to raise at least the lower temperature of the temperature gradient temperature range.

5. A method according to claim 2 comprising the further step of concentrating at least one of said components of the mixture prior to said deposition and transfer of the condensate, said concentration established by,
   a. condensing and subsequently evaporating the component gas, or
   b. absorbing and subsequently desorbing said component gas.

6. A method according to claim 2 wherein said coolant is a gas such as liquid nitrogen.

7. A method according to claim 2 wherein said temperature gradient extends from above the dew point of a water vapor component of the gas mixture to above the condensation temperatures of the gas mixture.

8. A method according to claim 1 wherein transferring a condensate deposit off the exchanger comprises flowing said gas mixture along the exchanger as the temperature gradient is translated and said condensate deposit is evaporated into the mixture.

9. A method according to claim 1 comprising the further step of tentatively identifying each component by determining its melting temperature and confirming said identification by determining the condensation temperature of each component.

10. A method of analyzing a gaseous mixture comprising the steps:
    a. establishing on an elongate heat exchanger a temperature gradient spanning the condensation temperatures of components of the mixture to be analyzed,
    b. flowing the mixture along the heat exchanger in a direction of decreasing temperature and thereby forming condensate deposits of the components at different positions along the length of the heat exchanger, and measuring the temperatures at said positions,
    c. successively raising the temperature of the lower part of the temperature gradient to above the temperature of the condensate deposit having the lowest condensation temperature, and thereby translating said temperature gradient along the heat exchanger, and displacing said condensate deposits toward the colder end, transferring the deposit having the lowest condensation temperature off the exchanger, and determining the melting temperature of said transferred deposit for identification thereof.

11. A device for analyzing a gaseous mixture of component gases having different condensation temperatures, comprising:
    a. inner and outer, substantially concentric tubes with adjacent surfaces defining between them an annular space traversable by the mixture to be analyzed,
    b. means for passing a coolant through said inner tube and thereby establishing a temperature gradient along said tube, increasing in temperature in the direction of coolant flow,
    c. means for flowing the gaseous mixture in said annular space in a direction of decreasing temperature, whereby condensate deposits of the component gases form on the surface of the inner tube at successively lower temperatures,
    d. means for measuring the temperatures axially along said inner tube surface where said deposits form,
    e. means for successively translating said temperature gradient axially along the inner tube and for transferring the deposit having the coldest condensation temperature off the inner tube by raising the temperature at the coldest deposit to its vaporization temperature, and
    f. means for measuring the melting temperature of each of said transferred deposits separately.

12. A device according to claim 11 wherein the inner tube has a polished surface.

13. A device according to claim 10 wherein the inner tube is made of nickel-plated or chromium-plated copper and the outer tube of glass.

14. A device according to claim 10 further comprising a plurality of baffle elements extending transversely in said annular space for inducing turbulent flow of the mixture in said annular space.

15. A device according to claim 10 wherein the means for measuring the temperatures comprise thermoelements disposed on the inner tube and an indicator to which the thermoelements are connected.

16. A device according to claim 10 further comprising means for concentrating the component gases prior to flowing the mixture through the inner tube.

17. A device for analyzing a gaseous mixture of component gases having different condensation temperatures comprising:
    a. an elongate member having a duct for receiving a flow of said gaseous mixture,
    b. means for flowing said mixture along said duct,
    c. means for establishing a temperature gradient along said duct decreasing in temperature in the direction of mixture flow, whereby condensate deposits of the component gases form on a surface of the duct at successively lower temperatures, d. means for measuring axially along the duct where said deposits form, e. means for successively translating said temperature gradient axially along the duct and for transferring the deposit having the coldest condensation temperature off the duct by raising the temperature at the coldest deposit to its vaporization temperature, and flowing said mixture through said duct, and f. means for measuring the melting temperature of each of said transferred deposits separately.

18. Process of analyzing a gaseous mixture with apparatus including a heat exchanger having an at least partially transparent outer tube and an inner tube with a cooled polished outer wall, comprising the steps of, a. establishing along said cooled, polished outer wall a temperature gradient spanning the high and low condensation temperatures of the components to be analyzed in said gaseous mixtures;

b. passing a flow of said gaseous mixture together with a carrier gas along said polished outer wall, said gaseous mixture proceeding between said high and low condensation temperatures, whereby the components to be analyzed of said gaseous mixture are separated by condensation on different sites dispersed along said polished wall, and each accumulation of condensate ends on the high temperature side of the corresponding site by a sharp boundary;

c. locating said sites of said condensates by optical means through the outer tube of said heat exchanger;

d. measuring the temperature at the site of said sharp boundary of each condensate;

e. shifting said temperature gradient slowly upwards step by step with time, thus evaporating each condensate one after the other, and thus separating each component of said mixture from the others;

f. transferring each separated and evaporated component by flowing the carrier gas to an identifying device and identifying said component; and computing the percentage of said identified component in said gaseous mixture from the measured temperature of said sharp boundary of the corresponding condensate of said component and from the phase diagram of said identified component linking the partial pressure to the condensation temperature.

19. Process of analyzing a gaseous mixture according to claim 18 wherein identifying each component comprises transferring each separated component by said carrier gas to a closed chamber wherein said component is frozen and transformed into solid state; raising the temperature of said polished surface until melting of said solid matter is observed; measuring at that moment the temperature of said polished surface; and identifying said component from the temperature thus measured as a melting point.

20. Process of analyzing a gaseous mixture according to claim 17 further comprising, passing a certain amount of said gaseous mixture through a container filled with a sorbent whereby the components to be analyzed of the gaseous mixture are trapped and thus concentrated; heating said container up to the desorption temperature of said sorbents whereby the trapped components are liberated; transferring said liberated components to a heat exchanger with a certain and relatively small amount of a carrier gas so that a gas mixture is formed in which the components to be analyzed are present in concentrations higher than those of these components in the original gaseous mixture.

21. Process of analyzing a gaseous mixture according to claim 17 further comprising (prior to establishing said temperature gradient) passing a certain amount of said gaseous mixture through at least one cold trap; cooling said trap down to a temperature at which the components in the gaseous mixture to be analyzed are trapped and concentrated; heating said trap up to a temperature at which said trapped components are liberated; and transferring said liberated components to a heat exchanger with a certain and relatively small amount of a carrier gas so that a gas mixture is formed in which the components to be analyzed are present in concentrations higher than those of these components in the original gaseous mixture.

20. A process according to claim 17 wherein the temperature gradient established along the cooled polished outer wall of the inner tube of the heat exchanger extends from an upper temperature which is above the dew point of the water vapor contained in the gaseous mixture to be analyzed to a lower temperature of the carrier gas.

23. A process according to claim 17 wherein said flow of said gaseous mixture is driven repeatedly against said cooled polished wall by deflecting means whereby a turbulent flow is insured.

24. A process as according to claim 17 wherein the temperature gradient along the cooled polished outer wall of the inner tube of the heat exchanger is established by passing through said inner tube a coolant flowing in the direction opposite to the direction of the gaseous mixture and the temperatures being regulated by adjusting the flow of the coolant.

PO-1050
(5/69)

UNITED STATES PATENT OFFICE
CERTIFICATE OF CORRECTION

Patent No. 3589169          Dated June 29, 1971

Inventor(s) RENE LAFITTE ET AL

It is certified that error appears in the above-identified patent and that said Letters Patent are hereby corrected as shown below:

Col. 2, line 45, "said" should be -- . Said--

Col. 5, line 17, "$10^{12}$p.p.m." should be --$10^{-2}$p.p.m.--

Claims 13, 14, 15, 16, line 1, delete "10" and insert --11--

Claims 20, 21, 22, 23 and 24, line 1, delete "7" and insert --18--

Col. 8, line 32, should be claim --22-- and not "20"

Signed and Sealed this   17th day of   April        1973.

(SEAL)
Attest:

EDWARD M. FLETCHER, JR.                ROBERT GOTTSCHALK
Attesting Officer                      Commissioner of Patents